United States Patent [19]

Ritchey

[11] 4,000,744
[45] Jan. 4, 1977

[54] EAR TAG APPLYING TOOL

[76] Inventor: Eugene B. Ritchey, Rte. 3, Box 58, Brighton, Colo. 80601

[22] Filed: Feb. 10, 1975

[21] Appl. No.: 548,249

Related U.S. Application Data

[63] Continuation-in-part of Ser. No. 513,655, Oct. 10, 1974, abandoned, which is a continuation-in-part of Ser. No. 494,604, Aug. 5, 1974, abandoned.

[52] U.S. Cl. .................................. 128/330; 40/301
[51] Int. Cl.² ........................................ A61B 17/00
[58] Field of Search ..................... 40/301; 128/330

[56] References Cited

UNITED STATES PATENTS

| | | | |
|---|---|---|---|
| 3,001,270 | 9/1961 | Friedman | 128/330 X |
| 3,334,434 | 8/1967 | Melin | 40/301 |
| 3,512,289 | 5/1970 | Hayes | 128/330 X |
| 3,605,310 | 9/1971 | Brown | 40/301 |
| 3,867,777 | 2/1975 | Potter | 40/301 |

FOREIGN PATENTS OR APPLICATIONS

| | | | |
|---|---|---|---|
| 844,828 | 6/1970 | Canada | 40/301 |

Primary Examiner—Channing L. Pace

[57] ABSTRACT

There is provided an improved tool for piercing the skin and inserting a loopless animal identification tag, said tool being characterized in that it is removable from the animal's skin from either side of the skin pierced. The tool comprises an elongate rigid member having a handle portion, an intermediate, integral tag holding portion, and an integral pointed and sharpened skin piercing end portion. The tag holding portion includes longitudinally extending slot means for releasably holding the laterally extending securing edges of an identification tag in a folded attitude prior to insertion. Such slot means may take the form of (1) a single wide slot, (2) two parallel slots of equal length substantially the same length as the securing edges, (3) two parallel slots of equal length but substantially longer than securing edges, and (4) two parallel slots of unequal length one being substantially the same length as securing edges and the other being substantially longer than the securing edge.

13 Claims, 19 Drawing Figures

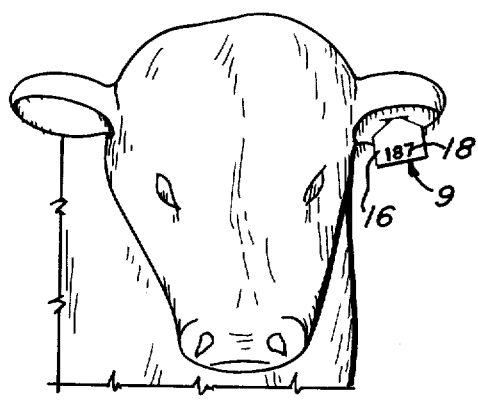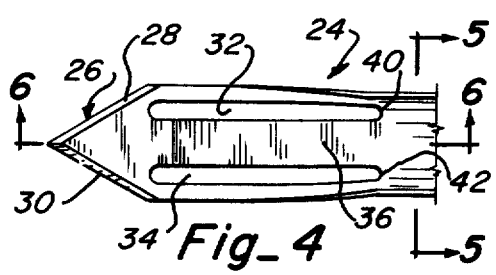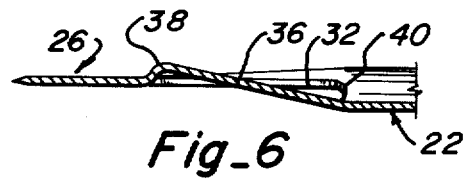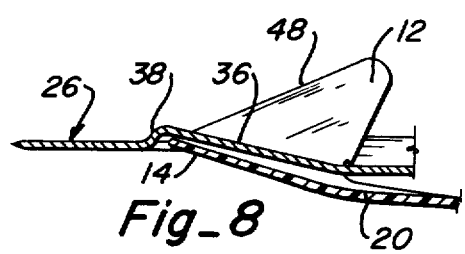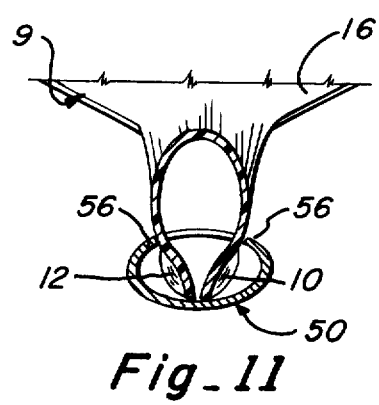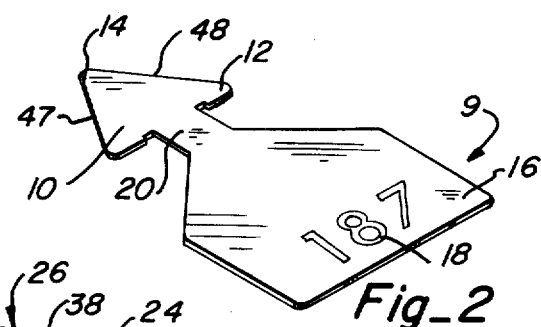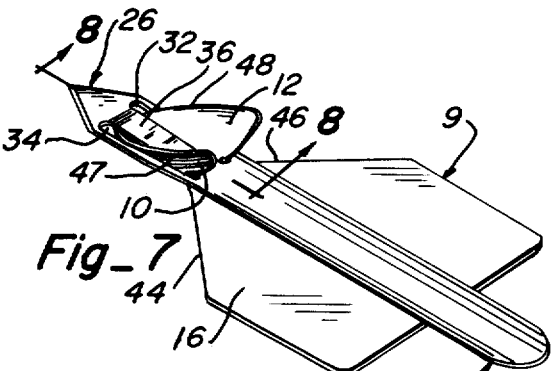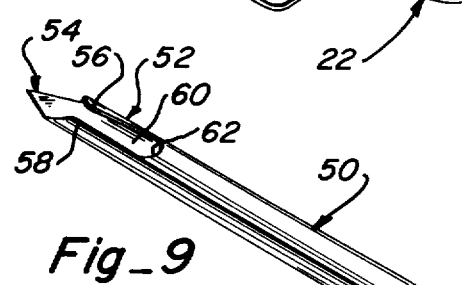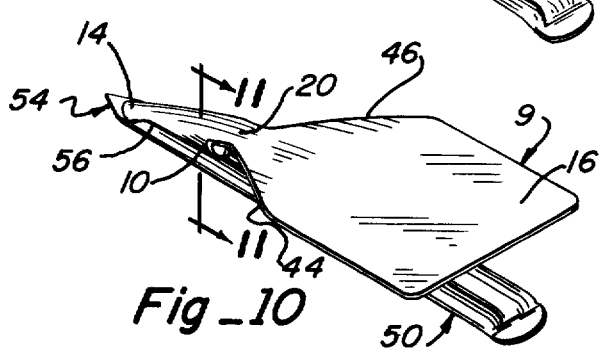

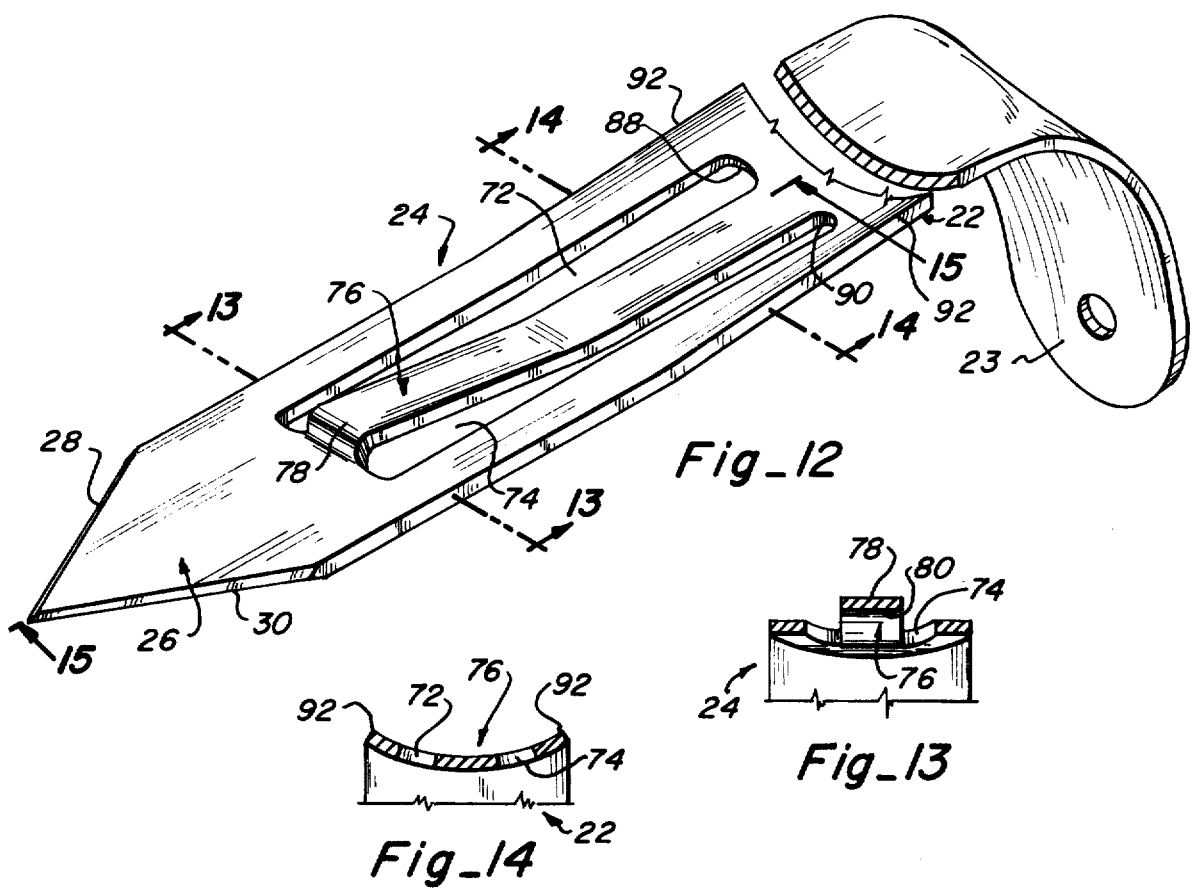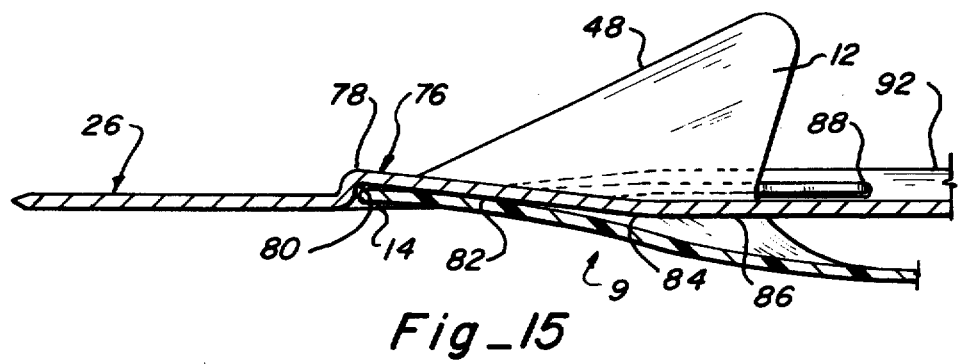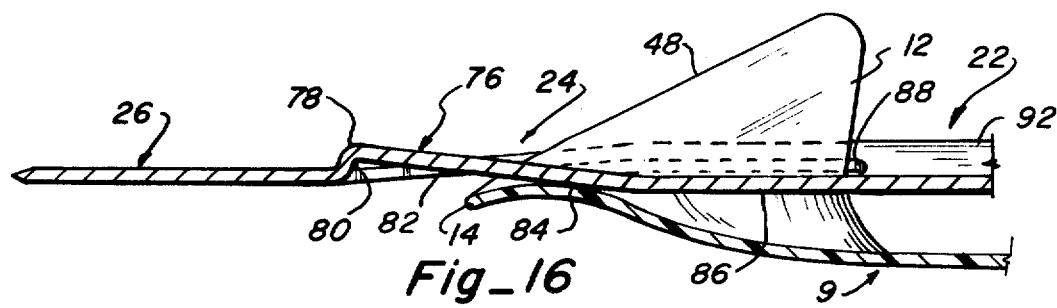

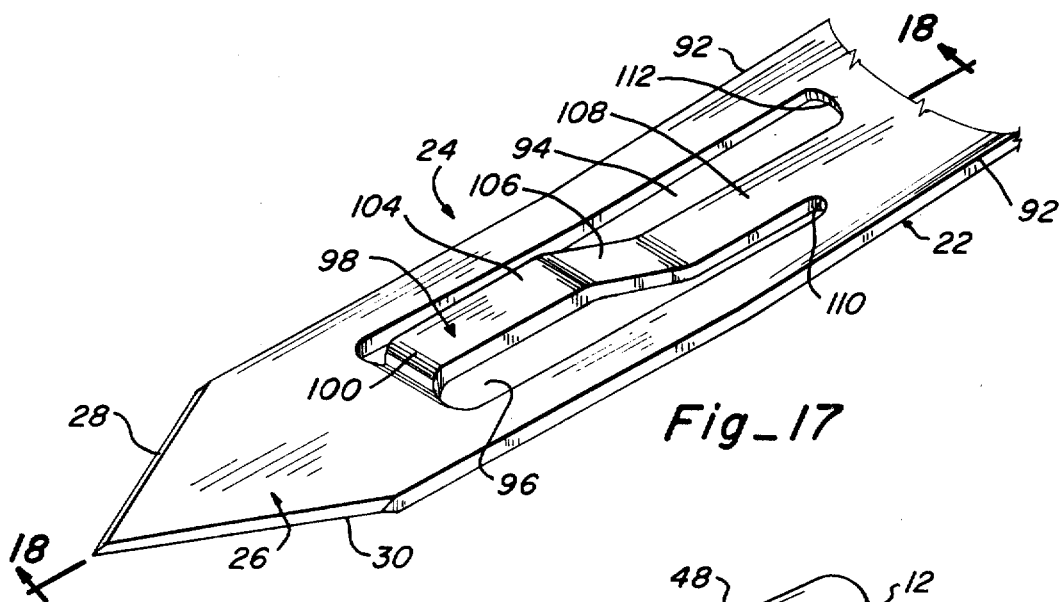
Fig_17
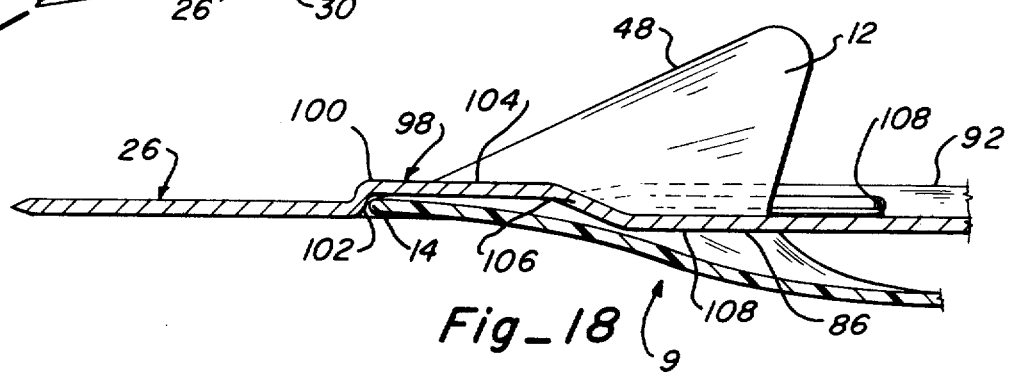
Fig_18
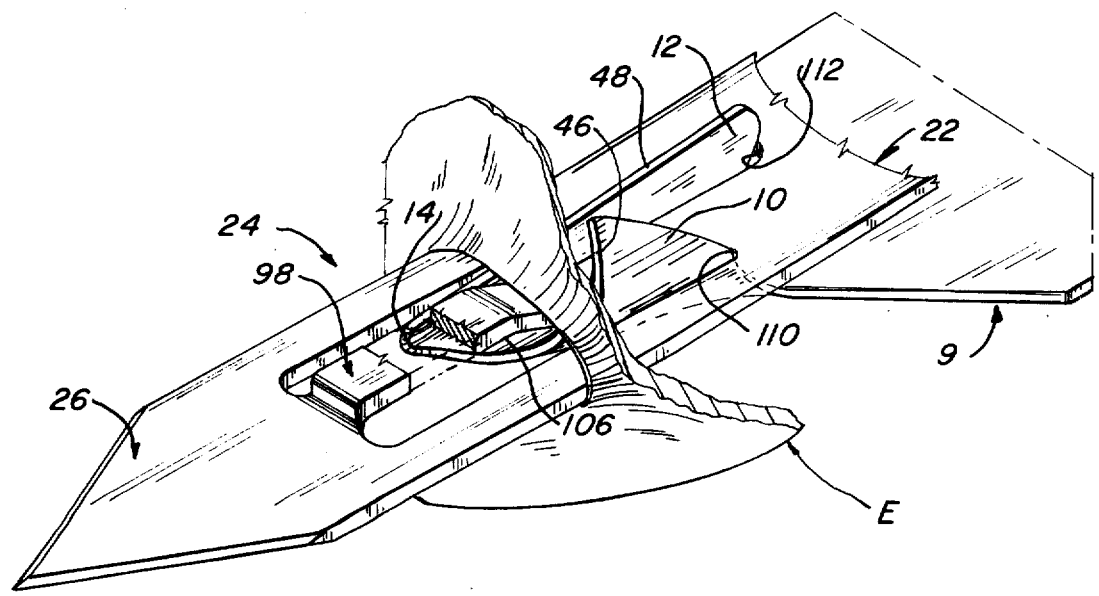
Fig_19

EAR TAG APPLYING TOOL

BACKGROUND OF THE INVENTION AND PRIOR ART

This application is a continuation-in-part of my previous continuation-in-part application, Ser. No. 513,655, filed Oct. 10, 1974, and entitled EAR TAG APPLYING TOOL now abandoned which in turn is a continuation-in-part of my previous application, Ser. No. 494,604, filed Aug. 5, 1974 and entitled EAR TAG APPLYING TOOL now abandoned.

The present invention relates to an improved tool for inserting a loopless animal identification tag as, for example, through the ear of livestock. Ear tags of the type with which the tools of the present invention are particularly useful are clearly shown and described in my prior U.S. Pat. No. 3,552,051. The subject matter of my prior patent is hereby incorporated herein in its entirety by reference thereto.

This patent also shows a type of tool for piercing the animal skin and inserting the tag, which tool is characterized in that it must completely pass through the ear, for example, of the livestock in order to carry with it the identification tag. Another form of tag applying tool is shown and described in my application Ser. No. 456,534 filed Apr. 1, 1974 now U.S. Pat. No. 3,916,904. Here again the tool must pass entirely through the ear of the animal.

The present invention is directed to the provision of a tool which may be used to insert the ear tags of the type described in my U.S. Pat. No. 3,552,051 and which tool may, if desired, pass entirely through the ear of the animal, or may be inserted partially through the ear to set the tag, and then pulled back out of the ear on the same side as it entered. Some of those applying the identification tags to livestock prefer to operate entirely from one side of the skin whereas others prefer to pull the tool entirely through the skin. The present tool will accommodate both modes of operation.

BRIEF STATEMENT OF THE INVENTION

Briefly stated, the present invention is in a tool for piercing the skin to make a slit for inserting a loopless animal identification tag having flexible laterally extending securing ledges, a tag portion, and a relatively narrower skin traversing portion joining the laterally extending securing ledges and tag portion.

Tools in accordance with the present invention are characterized in that they are removable from the animal's skin from either side of the skin pierced. They comprise an elongate, rigid member having a handle portion, an intermediate integral tag holding portion and an integral pointed generally planar and sharpened skin piercing portion. The cross section profile of each of these segments in preferred embodiments is substantially the same although the cutting portion, may, if desired, be flattened. The tag holding portion includes longitudinally extending slot means either extending through the tool or formed from folded over edges thereof. These means releasably hold the laterally extending securing ledges of the identification tag in a folded attitude generally perpendicular to the slit prior to insertion.

In operation, if the tool is to be removed from the same side as it entered, then, after insertion of the delta shaped tip of the identification tag through the ear, the securing ledges will engage behind the skin pierced and hold the identification tag while the tool is pulled back out. The tool is pulled back out only after the securing ledges are disengaged therefrom by engagement of the relatively large leading edges of the tag portion which contacts the skin beyond the incision causing the securing edges of the tip to be released from the tool during the forward movement of the tool. Where such a tool is passed on through the ear, the securing ledges of the tip are disengaged from the tool, as before, but the tool continues to move forward through the ear until it passes entirely therethrough.

In the case of the tool where the securing ledges are retained in a folded attitude in a slot formed from folded over edges of the tool, the tool carries the securing ledges through the incision and on reversing the direction of the tool, the securing ledges engage on the side of the skin opposite to side of entry and retain the tag against passage back through the incision. By merely sliding the tool relative to the tag, the tool is freed from the tag. On moving the tool entirely through the skin of the animal, from one side to the other, the leading edges of the tag identification portion again are too large to pass through the incision and hold the tag while the tool is moved relative thereto whereby the folded leading portion is lifted from the slot in the tool and the tag retained while the tool passes on through in the same direction as it entered.

BRIEF DESCRIPTION OF THE DRAWINGS

The foregoing invention may be better understood by having reference to the annexed drawings wherein:

FIG. 1 is an illustration of an animal having a loopless identification tag in its left ear.

FIG. 2 is an illustration in perspective of a flexible loopless identification tag of the type described in my aforesaid U.S. Pat. No. 3,552,051.

FIG. 3 is a perspective illustration of one form of tool in accordance with the present invention.

FIG. 4 is a fragmentary plan view of the pointed and sharpened skin piercing end portion and the intermediate integral tag holding portion of a tool such as that illustrated in FIG. 3

FIG. 5 is a cross-sectional view of the tool as shown in FIG. 4 as it appears in the plane indicated by the line 5—5 in FIG. 4.

FIG. 6 is a fragmentary cross-sectional view of the portions of the tool shown in FIG. 4 as it appears in the plane indicated by the line 6—6 in FIG. 4.

FIG. 7 is a perspective illustration of the tool shown in FIG. 3 having an identification tag like that shown in FIG. 2 in position with the securing ledges in a folded attitude prior to insertion.

FIG. 8 is a cross-sectional view of the tool and tag assembly shown in FIG. 7 as it appears in the plane indicated by the line 8—8 of FIG. 7.

FIG. 9 is a perspective illustration of another form of tool in accordance with the present invention.

FIG. 10 is a perspective illustration of a tool such as shown in FIG. 9 having an identification tag attached thereto with the laterally extending securing ledges thereof in a folded attitude prior to insertion.

FIG. 11 is a cross-sectional view of the tool-tag assembly shown in FIG. 10 as it appears in the plane indicated by the line 11—11 in FIG. 10.

FIG. 12 is a perspective illustration of still another form of tool in accordance with the present invention.

FIG. 13 is a cross-sectional view of the tool as it appears in the plane indicated by the line 13—13 in FIG. 12.

FIG. 14 is a cross-sectional view of the tool as it appears in the plane indicated by the line 14—14 in FIG. 12.

FIG. 15 is a cross-sectional view of the tool as it appears in the plane indicated by the line 15—15 in FIG. 12, and showing the anchoring head in its initial forward position.

FIG. 16 is a view similar to FIG. 15, but showing the anchoring head in its final rearward position and cammed partially out of engagement with the slots.

FIG. 17 is a perspective illustration of a further embodiment of tool in accordance with the present invention.

FIG. 18 is a longitudinal section, taken along line 18-18 of FIG. 17 showing the anchoring head in initial forward position prior to installation.

FIG. 19 is a perspective illustration, similar to FIG. 17, but showing the position of the anchoring head after the tip thereof has passed through an animal's ear and the anchoring head has been forced to the rearmost just prior to release from the tool.

DESCRIPTION OF THE PREFERRED EMBODIMENTS

FIG. 1 shows a loopless plastic flexible identification tag in the ear of an animal, this type of tag commonly being used in the identification of cattle.

FIG. 2 shows a flexible elastomeric identification tag which is described in detail in my U.S. Pat. No. 3,552,051 dated Jan. 5, 1971. These tags are conveniently formed of carbon black filled polyurethane and in overall dimension are approximately 3 inches by 4¾ inches in length. As shown in FIG. 2 therefore the identification tag comprises a pair of laterally extending rearwardly diverging wings or securing ledges or detent shoulders 10 and 12 which come to a rounded point 14 and form an arrowhead or delta shaped anchoring head. A tag portion or marking panel 16 of larger lateral dimension than the securing ledges 10 and 12 is provided and carries an identification number such as the number 187. The number may be printed on the tag or embossed thereon in contrasting color for easy visibility. The tag portion 16 and the laterally extending securing ledges 10 and 12 are joined together by a relatively narrower neck or skin traversing portion 20. In one embodiment the width of the skin traversing portion is 11/16ths of an inch. It is this portion of the identification tag that extends through the incision as shown in FIG. 1.

FIGS. 3 to 7 inclusive show a preferred embodiment of the present invention which is conveniently formed by stamping from a steel sheet. As shown in FIG. 3, the tool includes an elongate handle portion 22, an intermediate integral tag holding portion 24, and an integral pointed and sharpened skin piercing end portion 26. FIG. 4 shows in greater detail in a plan view the tag holding portion 24 and the skin piercing portion 26. The skin piercing portion is a flattened to be generally planar and is sharpened triangular shaped knife being sharpened along edges 28 and 30. The intermediate tag holding portion includes tag retaining means and in the embodiment shown in FIGS. 3 to 8 inclusive, these means comprise a pair of slots 32 and 34 which are generally coplanar with portion 26 and are dimensioned to accept the thickness of the identification tag such as shown in FIG. 2 in a loose fit, and the axial length of the laterally extending securing ledges or detent shoulders 10 and 12. Lying between the slots 32 and 34 is a longitudinally extending bar 36 which defines the inner peripheries of the slots 32 and 34. As best shown in FIG. 6, the leading portion 38 of the bar 36 is deformed out of the plane of the pointed and sharpened skin piercing portion to provide as shown in FIG. 8, a shielding recess for the rounded tip 14 of the identification tag shown, for example, in FIG. 2. This enables the leading portion of the identification tag as represented by the rounded tip 14 to better traverse the incision in the ear, for example. As shown in FIG. 8, the relatively narrower skin traversing portion 20 underlies the tool. The tag portion also underlies the tool portion 22 as best shown in FIG. 7.

While the preferred embodiment of the tool shown in FIG. 3 is flattened in the skin piercing portion 26 and in the intermediate portion 24 undergoes transition in cross-sectional contour to the contour shown in FIG. 5 for the handle portion, the cross-sectional contour may be the same in each of the three portions, 22, 24 and 26. In general, the major cross-sectional contour of the tool shown in FIG. 3 is arcuate as shown in FIG. 5 for better handling. The handle portion may also be flat. The curvature, however, contributes to the rigidity of the tool.

As indicated above, the tool shown in FIGS. 3 to 8 inclusive may be used according to either mode practiced by livestock handlers or stockmen. To insert a loopless indentification tag of the type shown in FIG. 2 in the ear of an animal such as shown in FIG. 1, the identification tag is releasably attached to the tool in the manner shown in FIG. 7 with the laterally extending securing ledges disposed in a folded attitude generally perpendicular to and protruding from the longitudinally extending slots 32 and 34 on the upper side of the tool as shown, with the balance of the identification tag 9 underlying the handle portion 22 of the tool. In connection with the latter, the tag is releasably secured to the tool due to the resilient ledges seeking return to their normal position as a result of their elastic memory. To insert the tag, the tool is grasped by the handle portion 22 and moved forward until skin piercing portion 26 is inserted through the ear from front to back. The tool is continued to be inserted through the incision formed by the skin piercing portion and carries the anchoring head with it through abutment of the locking ledges 10 and 12 against the trailing edges 40 and 42 of slots 32 and 34, respectively, and the slope of the leading edges of the securing ledges 10 and 12, which are generally perpendicular to the incision, tending to spread the incision slightly to admit these. When the tool is to be passed completely through the ear from front to back, when the leading edges of the tag portion, namely edges 44 and 46, contact the front of the ear, their inability to pass through the relatively small incision prevents further movement of the identification tag with respect to the ear, and the securing portions 10 and 12 now must be released from the slots 32 and 34, allowing the tool to be passed completely through the incision leaving the identification tag in place. The flexibility of the securing ledges 10 and 12 and their natural tendency to return to their original planar configuration causes the tag to become secured in the incision formed by the tool.

When it is desired to operate the tool in the other mode, that is, by inserting from the front side of the ear and withdrawing the tool from the front side of the ear, the tag is applied to the tool in the same manner as FIG. 7 and the incision and passage of the securing ledges 10 and 12 through the ear is identical to that previously described for the first mode of operating the tool. Instead of passing the tool completely through the ear, after the securing ledges 10 and 12 have traversed the ear and extend on the rear side thereof, the securing ledges 10 and 12 are released from the tool upon engagement of edges 44 and 46 with the front or first side of the ear and when the tool is pulled in a reverse direction the securing ledges 10 and 12 engage the other side of the ear adjacent the incision to hold it in place during the removal of the tool through the front side.

FIGS. 9 to 11 show another embodiment of a tool which may be used in the same manner as that shown in FIGS. 3 to 8, inclusive. Accordingly, in FIGS. 9 to 11, there is shown a tool having a handle portion 50, and an intermediate integral tag holding porton 52, and a pointed and sharpened skin piercing end portion 54. In general, the cross section of the handle portion 50 is oval such as shown in FIG. 11. In this embodiment and as best shown in FIG. 10, the identification tag overlies the tool. The securing ledges 10 and 12 are again placed in a folded attitude albeit in a downwardly directed position with the tool of FIGS. 9 to 11, and the intermediate portion joining the securing ledges 10 and 12 disposed angularly with respect to the recess or slot 60 created by the overfolded marginal edges 56 and 58. Slot 60 is generally parallel to the plane of end portion 54. The outer edges of the folded securing ledges 10 and 12 are located in the recess in the manner shown in FIG. 11. The rounded point 14 at the convergence of leading edges 47 and 48 rests against the upper face of the pointed and sharpened skin piercing end portion 54 and provides with the arched skin traversing portion 20 an inclined guide for spreading the incision to admit the tag wherein securing ledges 10 and 12 are generally perpendicular to the plane of end portion 54, as seen in FIG. 11. The manner of inserting the identification tag into the ear of an animal is identical to that described above in connection with the instruments shown in FIGS. 3 to 8 inclusive with the exception that the tag overlies the tool. In the first mode where the tool is to be passed completely through the ear, for example, the leading edges 44 and 46 of the tag portion 16 abut against the forward surface of the ear and prevent further movement of the tag with respect to the ear whereupon the trailing edge 62 of the slot 60 exerts a camming effect to lift the securing ledges 10 and 12 and forward portion of the tag 9 out of the slot 60 after the securing ledges 10 and 12 have completely traversed the ear and are in secured position behind the ear.

When the tool is to be used in the second mode and removed from the same side in which it entered, the insertion procedure is the same as just above described. After release of the securing ledges 10 and 12, as before, reverse movement of the tool will permit it to be removed. The reverse action easily slides the overfolded securing ledges 10 and 12 from the slot 60 and permits easy withdrawal of the tool from the ear leaving the tag secured in place in the ear.

A variation of the first form of the invention is illustrated in FIGS. 12 to 16 in which the tool is basically the same in form, including handle portion 22, intermediate portion 24, and forward flattened end 26.

Slots 72 and 74 are similar to slots 32 and 34 of the first form and extend longitudinally in spaced parallel relation on opposite sides of the centerline of the tool. In the first form of the invention it will be noted that slots 32 and 34 are of substantially the same length as the axial length of the anchoring head and just allow for easy insertion and removal of the diverging wings with their detent shoulders 10 and 12 in a position generally perpendicular to end 26, as shown in FIG. 18. In this modification the slots 72 and 74 and substantially longer than the anchoring head and it has been found that a slot length of the order of twenty-five percent greater than the axial length of the head is quite satisfactory to allow longitudinal movement of the head sufficient to produce the improved action to be described below.

The two slots define between them a guide bar 76 which differs from bar 36 of the first form. The latter has a sloped or camming surface extending in a straight line substantially from end to end of slots 32 and 34. Guide bar 76 is deformed upward at 78 above the plane of forward end 26 to define a shielding recess 80 in its underside to receive the leading end 14 of the anchoring head 9 and guide its progress through the element to be tagged. The forward portion of the guide bar constitutes cam means extending longitudinally between movement, cam surface 82 engages the inner face of the folded anchoring head along its centerline and deflects it away from the tool, urging the diverging wings partially out of their slots and initiating a releasing movement which is completed by the resilient action of the wings seeking to return to their normal planar condition. It will be apparent that when the anchoring head is in the position shown in FIG. 16, the tip on point 14 of anchoring head 9 will have passed through the animal tissue, such as an ear, which has been omitted from the drawing for clarity of illustration. At this point securing edges 10 and 12 will be ready to pass through the incision which has just been made. When the thrust is completed, the anchoring head is fully expanded with the securing ledges in open or spread position on the remote side of the ear to secure the tag in place. The tool can then be removed in either the forward or aft direction, as selected by the operator.

A still further embodiment is shown in FIG. 17-19 which is generally similar to the embodiment of FIGS. 12-16 and wherein like parts have like reference numerals. However, a potential problem with the embodiment of FIGS. 12-16 is that because of the extended length of slots 72 and 74 beyond the length of securing ledges 10 and 12, if the operator is not careful he may insert the anchoring head too far to the rear of the tool. If this occurs, the tip 14 rather than being positioned in recess 80 as shown in FIG. 15 may be displaced downwardly, more to the position shown in FIG. 16. If this occurs, the tip of the anchoring head will catch on the animal skin adjacent the slot causing the tag to be stripped from the tool rather than passing through the slit formed by the tool.

Another problem which can occur, particularly with young calves ears, using the tool of FIGS. 12-16 is that the slots tend to hold ears 10 and 12 in vertical position and the slit formed by piercing point 26 must ride up along edges 47 and 48 which can cause tearing of the ear. Thus, with young animals undesirable tearing of the cartilage in the ear when this tool is used to install tags may occur.

The tool of FIG. 17-19 includes a pair of parallel elongated slots such as longer slot 94 and shorter slot 96 separated by guide bar 98. The guide bar is deformed upwardly at 100 above the plane of forward flattened end 26 to define a shielding recess 102 in its underside to receive the leading end 14 of the anchoring head and guide its progress through the slit formed in the animal skin. Guide bar 98 has an aft extending horizontal portion 104 which terminates in a downwardly extending cam surface 106 which in turn terminates in a rearwardly extending portion 108 which lies in the plane of the center line of the handle portion 22.

Conveniently, the length of slot 96 is substantially the same length as the securing ears, such securing ear 10 whose rear edge engages the aft end 110 of slot 96. Thus, the length of slot 96 will determine the initial position of the ear tag so that end 14 is received within recess 102 and is properly positioned as shown in FIG. 18 with securing ledges 10 and 12 extending generally perpendicular to end 26.

Conveniently, the length of slot 94 is approximately 25 per cent longer than slot 96 and permits a rearward twisting movement of anchor head 9 until the rear edge of wing 12 is in engagement with the aft end 112 of slot 94. As seen in FIG. 19, this rearward twisting action is caused by the high dragging force on the head as it is driven through a relatively small aperture, as through the ear E of an animal as shown. This twisting force causes ear 12 to move downwardly through slot 94 and therefore greatly reduces the force required to push ears 12 and 10 through the aperture so that the tag can be relatively easily installed. Furthermore, because the ear E is soft and pliable, it will take on a generally funnel-shaped appearance, as seen in FIG. 19, due to the force of the tool passing through it. This shaping of ear E causes ears 10 and 12 of the tag to tend to be folded inwardly as shown, further reducing the resistance to the passage of the anchor head 9 through the formed slit. If the animal in which the tag installation is being made is a young calf, the tender cartilage in the ear is not as likely to tear due to the force exerted by ears 10 and 12 since they will be in a less rigid and folded over position by the time they enter the aperture or slit.

The invention has been described in detail with particular reference to a plurality of embodiments thereof, but it will be understood that variations and modifications can be effected within the spirit and scope of the invention.

What is claimed is:

1. A tool for piercing a portion of the skin of an animal accessible from opposite sides to form a generally planar slit for inserting a loopless animal identification tag having a pair of flexible laterally extending foldable securing ledges, a tag portion, and a relatively narrower skin traversing portion joining said laterally extending securing ledges and said tag portion, said tool being characterized in that it is removable from the portion of the animal's skin from either side, said tool comprising an elongated rigid member having:

a handle portion;
an integral portion, pointed, flattened, generally planar and sharpened skin piercing end portion to pierce the portion of the animal's skin and form a slit for passage of said securing ledges therethrough; and
an intermediate integral tag holding portion joining said handle portion and said sharpened end portion including longitudinally extending slot means near said pointed end portion lying in a plane parallel to that of said flattened end portion for releasably holding the pair of laterally extending securing ledges of said identification tag in a folded attitude generally perpendicular to the plane of said flattened end portion prior to insertion through the slit.

2. A tool for piercing a portion of the skin of an animal accessible from opposite sides to form a generally planar slit for inserting a loopless animal identification tag having a pair of flexible laterally extending foldable securing ledges, a tag portion, and a relatively narrower skin traversing portion joining said laterally extending securing ledges and said tag portion, said tool being characterized in that it is removable from the portion of the animal's skin from either side, said tool comprising an elongated rigid member having:

an elongated handle portion;
an integral, pointed, flattened, generally planar and sharpened piercing end portion to pierce the portion of the animal's skin and form a slit for passage of the securing ledges therethrough, said slots being generally coplanar with said planar end portion;
an intermediate integral tag holding portion joining said handle portion and said sharpened end portion including a pair of parallel axially extending slots near said sharpened end portion dimensioned to receive and frictionally retain the pair of flexible laterally extending securing ledges of said tag in folded position generally perpendicular to the plane of said flattened portion prior to insertion through the slit and to release said securing ledges when the securing ledges have followed the tool through the slit in the portion of the skin, and an intermediate longitudinally extending bar disposed between said slots and defining the inner peripheries of said respective slots, said bar being deformed out of the cross-sectional configuration to form a recess to receive the leading tip of the identification tag and aid in its insertion through the slit in the portion of the skin.

3. A tool for piercing a portion of the skin of an animal accessible from opposite sides to form a generally planar slit for inserting a loopless animal identification tag having a pair of flexible laterally extending foldable securing ledges, a tag portion, and a relatively narrower skin traversing portion joining said laterally extending securing ledges and said tag portion, said tool being characterized in that it is removable from the animal's skin from either side, said tool comprising an elongated rigid member having a top and a bottom and front and back ends defined by the orientation of the tool when being used and having:

an elongated tubular handle portion;
an integral, pointed, flattened, generally planar and sharpened skin piercing front end portion extending from the bottom of said rigid member to pierce a portion of the animal's skin accessible from opposite side and form a slot for passage of said securing ledges therethrough;
an intermediate integral tag holding portion joining said handle and front end portions including a longitudinally extending slot in the top wall of said tubular body closed at the end adjacent the handle portion and open at the opposite end, said slot having parallel side edges to receive and frictionally retain the securing ledges in a folded condition generally perpendicular to the plane of said flattened front end portion prior to insertion through the slit and to hold the tip of said tag against the lower inside surface of the tag holding portion.

4. A tag inserting tool for use with a tag of generally flat resilient material formed with a laterally extensive marking panel, a narrow neck connected at its aft end to the forward end of the panel, and an anchoring head connected at its aft end to the forward end of the neck and provided with a narrow leading end and a pair of rearwardly diverging foldable wings defining detent shoulders at the forward end of the neck, the tool comprising:

a slender elongate shank having a flattened, generally planar forward end provided with a piercing point to pierce a portion of an animal's skin to form a slit for passage of the anchoring head, an intermediate portion, and an aft portion serving as a handle for manipulating the tool;

the intermediate portion being provided with a pair of laterally spaced, longitudinally extending parallel slots at opposite sides of the centerline of the shank and defining between them a guide bar, said slots being generally coplanar with said forward end;

the slots serving to releasably hold the diverging wings of the anchoring head in folded attitude generally perpendicular to the slit prior to insertion through the slit with the centerline portion of the head in contact with the guide bar;

the forward end of the guide bar being deformed out of the general plane of the shank in a first direction to form a shielding recess to receive the forward tip end of the anchoring head and guide its progress through the portion of the animal's skin;

the forward portion of the guide bar aft of the deformed end extending angularly back toward and at least to the plane of the shank centerline to define a cam surface to deflect the anchoring head in the course of the insertion operation;

at least one of the slots and guide bar being substantially longer than the axial length of the anchoring head to provide a rearward path of travel for the anchoring head from its initial loaded position within its forward tip end in the shielding recess to a final position with its detent shoulders at the aft ends of the slots as a result of dragging force on the head during insertion; and the cam surface of the guide bar acting to deflect the anchoring head away from the shielding recess during relative downward movement of the head with respect to the guide bar and at least partially remove the wings from the slots and facilitate their complete release by the resilient action of the tag material.

5. A tool as claimed in claim 4 in which:
the length of at least one of the slots in the shank is of the order of twenty-five percent greater than the axial length of the anchoring head.

6. A tool as claimed in claim 4 in which:
the aft handle portion has an upwardly concave arcuate cross section;
the flattened end lies substantially in the plane of the upper marginal edges of the handle portion;
the shielding recess portion of the guide bar extends above the plane of the forward end; and
the forward portion of the guide bar aft of the shielding recess extends angularly downward and rearward at least down to the plane of the centerline of the handle portion.

7. A tool as claimed in claim 6, in which:
the aft portion of the guide bar extends substantially in the plane of the centerline of the handle portion.

8. A tag inserting tool for use with a tag of generally flat resilient material formed with a laterally extensive marking panel, a narrow neck connected at its aft end to the forward end of the panel, and an anchoring head connected at its aft end to the forward end of the neck and provided with a narrow leading end and a pair of rearwardly diverging foldable wings defining detent shoulders at the forward end of the neck, the tool comprising:

a slender elongate shank having a flattened, generally planar forward end provided with a piercing point to pierce a portion of an animal's skin accessible from opposite sides to form a slit for passage of the anchoring head therethrough, an intermediate portion, and an aft portion serving as a handle for manipulating the tool;

the intermediate portion being provided with a pair of laterally spaced, longitudinally extending parallel slots at opposite sides of the centerline of the shank, said slots being generally coplanar with said forward end;

means forming a shielding recess adjacent the forward ends of the slots to receive the forward tip end of the anchoring head and guide its progress through the portion of the animal's skin;

cam means extending longitudinally between the slots aft of the shielding recess and having a cam surface diverging rearwardly from the longitudinal axis of the tool;

the slots serving to releasably hold the diverging wings of the anchoring head in folded attitude generally perpendicular to the slit prior to insertion through the slit;

the slots being substantially longer than the axial length of the anchoring head to provide a rearward path of travel for the anchoring head from its initial loaded position with its forward tip end in the shielding recess to a final position with its detent shoulder at the aft ends of the slots as a results of dragging force on the head during insertion;

the cam surface being arranged to engage the inner face of the folded anchoring head along its centerline and deflect it away from the tool as the head moves rearward relative to the tool to initiate releasing movement of the wings from the slots.

9. A tool as claimed in claim 8 in which:
the length of the slots in the shank is of the order of twenty-five percent greater than the axial length of the anchoring head.

10. A tool as claimed in claim 8 in which:
the maximum divergence of the cam surface from the longitudinal axis of the tool is located about midway of the length of the slots.

11. A tag inserting tool for use with a tag of generally flat resilient material formed with a laterally extensive marking panel, a narrow neck connected at its aft end to the foward end of the panel, and an anchoring head connected at its aft end to the forward end of the neck and provided with a narrow leading end and a pair of rearwardly diverging foldable wings defining detent shoulders at the forward end of the neck, the tool comprising:

a slender elongate shank having a flattened, generally planar forward end provided with a piercing point to pierce portion of an animal's skin accessible from opposite sides and form a slit for passage of the anchoring head therethrough, an intermediate portion, and an aft portion serving as a handle for manipulating the tool;

the intermediate portion being provided with a pair of laterally spaced, longitudinally extending parallel slots at opposite sides of the centerline of the shank, and slots being generally coplanar with said forward end;

means forming a shielding recess adjacent the forward ends of the slots to receive the forward tip end of the anchoring head and guide its progress through the portion of the animal's skin;

cam means extending longitudinally between the slots aft of the shielding recess and having a cam surface diverging rearwardly from the longitudinal axis of the tool;

the slots serving to releasably hold the diverging wings of the anchoring head in folded attitude generally perpendicular to the slit prior to insertion through the slit;

one of the slots being substantially the same length as the axial length of the anchoring head to position the anchoring head in its initial position with the forward tip in the shielded recess, and the other of the slots being substantially longer than the axial length of the anchoring head to provide a rearward path of travel for the anchoring head from its initial loaded position with its forward tip end in the shielding recess to a final position with its detent shoulders at the aft ends of each of the slots as a result of dragging force on the head during insertion causing the anchoring head to be twisted as it is moved rearwardly so that the shoulder in the longer slot is cammed downwardly by the portion of the animal's skin ahead of the shoulder in the shorter slot to minimize resistance from the shoulders as the anchoring head passes through the slot; and the cam surface being arranged to engage the inner face of the folded anchoring head along its centerline and deflect it away from the tool as the head moves rearward relative to the tool to initiate releasing movement of the wings from the slots.

12. A tool as claimed in claim 11, in which:
the length of the longer slot in the shank is of the order of twenty-five percent greater than the shorter slot.

13. A tool as claimed in claim 11, in which:
the maximum divergence of the cam surface from the longitudinal axis of the tool is located about midway of the length of the longer slot.

* * * * *